United States Patent
Gupta et al.

(10) Patent No.: US 10,261,830 B2
(45) Date of Patent: Apr. 16, 2019

(54) CROSS-DEVICE TASK EXECUTION

(71) Applicant: Microsoft Technology Licensing, LLC, Redmond, WA (US)

(72) Inventors: Rahul Gupta, Hyderabad (IN); Abhijit Rao, Hyderabad (IN); Sundar Srinivasan, Hyderabad (IN); Nishchay Kumar, Hyderabad (IN); Justin George, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/182,308

(22) Filed: Jun. 14, 2016

(65) Prior Publication Data
US 2017/0357534 A1 Dec. 14, 2017

(51) Int. Cl.
*G06F 9/50* (2006.01)
*G06F 9/48* (2006.01)
*G06F 9/46* (2006.01)

(52) U.S. Cl.
CPC .......... *G06F 9/5027* (2013.01); *G06F 9/4881* (2013.01); *G06F 9/5072* (2013.01)

(58) Field of Classification Search
None
See application file for complete search history.

(56) References Cited

U.S. PATENT DOCUMENTS

| | | |
|---|---|---|
| 5,983,200 A | 11/1999 | Slotznick |
| 6,748,361 B1 | 6/2004 | Comerford et al. |
| 8,146,000 B1 | 3/2012 | Boliek et al. |
| 2004/0230636 A1 | 11/2004 | Masuoka et al. |
| 2005/0289264 A1 | 12/2005 | Illowsky et al. |
| 2011/0022641 A1 | 1/2011 | Werth et al. |
| 2011/0252071 A1 | 10/2011 | Cidon |
| 2013/0103749 A1 | 4/2013 | Werth et al. |
| 2014/0278436 A1 | 9/2014 | Khanna et al. |
| 2015/0256631 A1 | 9/2015 | Gordon |
| 2017/0169819 A1* | 6/2017 | Mese ...................... G10L 15/22 |

OTHER PUBLICATIONS

"International Search Report and Written Opinion Issued in PCT Application No. PCT/US2017/036245", dated Sep. 4, 2017, 13 Pages.
Bush, et al., "Personal Assistant Agent and Content Manager for Ubiquitous Services", In Proceedings of 3rd International Symposium on Wireless Communication Systems, Sep. 6, 2006, pp. 169-173.

(Continued)

*Primary Examiner* — Eric C Wai (57) ABSTRACT

Techniques and technologies for cross-device task execution are described. In at least some embodiments, a system includes a processing component configured to: receive device information associated with a networked group of devices; receive user preference information indicating one or more user preferences for performing one or more tasks; receive an indication of a task to be performed; select a designated device of the networked group of devices associated with the user to perform the task based at least partially on the user preference information; and transmit the task to be performed to the designated device.

20 Claims, 6 Drawing Sheets

(56) References Cited

OTHER PUBLICATIONS

Harroud, et al., "Agent-based Personalized Services in a Mobile Computing Environment", In Proceedings of IEEE Pacific Rim Conference on Communications, Computers and signal Processing, Aug. 26, 2001, pp. 728-731.

Purcher, Jack, "Apple introduces us to Siri, the Killer Patent", Published on: Jan. 19, 2012, Available at: www.patentlyapple.com/patently-apple/2012/01/apple-introduces-us-to-siri-the-killer-patent.html.

Chiu, et al., "Collaboratively Querying Sensor Networks through Handheld Devices", In Proceedings of International Conference on Mobile Data Management, May 1, 2007, pp. 30-35.

Román, et al., "A Middleware Infrastructure for Active Spaces", In Proceedings of IEEE Pervasive Computing, vol. 1, Issue 4, Oct. 2002, pp. 74-83.

"Google Now", Published on: Jul. 9, 2012, Available at: //en.wikipedia.org/wiki/Google_Now.

* cited by examiner

CROSS-DEVICE TASK EXECUTION

BACKGROUND

A substantial number of people live in environments with multiple devices. Typically, each of these devices has different capabilities. The differences in each device's capabilities may arise due to various factors, including processing capability, memory availability and memory type, software availability and type, hardware availability and type, power availability, data availability and type, and network connection, and other possible distinguishing factors. To perform various tasks, a person may select an appropriate device for a particular task, locate and activate the appropriate device, perform the particular task, and then move on to a different device to perform a different task. Although desirable results have been achieved using such conventional techniques, there is room for improvement.

SUMMARY

In at least some embodiments, a system for cross-device task execution includes a memory; at least one input/output component; and a processing component operatively coupled to the memory and to the at least one input/output component, the processing component configured to: receive device information associated with a networked group of devices associated with a user; receive user preference information indicating one or more user preferences for performing one or more tasks; receive an indication of a task to be performed; select a designated device of the networked group of devices associated with the user to perform the task based at least partially on the user preference information; and transmit the task to be performed to the designated device.

In addition, in at least some implementations, a method for cross-device task execution, comprises: receiving device information associated with a networked group of devices associated with a user; receiving user preference information indicating one or more user preferences for performing one or more tasks; receiving an indication of a task to be performed; selecting a designated device of the networked group of devices associated with the user to perform the task based at least partially on the user preference information; and transmitting the task to be performed to the designated device.

In at least some further implementations, a system for cross-device task execution, comprises: circuitry for receiving device information associated with a networked group of devices associated with a user; circuitry for receiving user preference information indicating one or more user preferences for performing one or more tasks; circuitry for receiving an indication of a task to be performed; circuitry for determining which device of the networked group of devices to designate to perform the task, including: circuitry for selecting a designated device of the networked group of devices associated with the user to perform the task based at least partially on the user preference information; and circuitry for transmitting the task to be performed to the designated device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the use of the same reference numbers in different figures indicates similar or identical components.

DETAILED DESCRIPTION

The present disclosure describes techniques and technologies for cross-device task execution. As described more fully below, techniques and technologies for cross-device task execution in accordance with the present disclosure may advantageously enable a user to create a pool of capabilities so that all capabilities of all of a user's devices are accessible from any of the devices of the group. In other words, to access a particular capability, a user need not go to a particular device having that particular capability, but rather, may access the particular capability from any of the devices of the group. In at least some implementations, a software application referred to herein as a "personal assistant" is installed on each of the user's devices of a group, enabling the user to leverage all of the pooled capabilities of all the devices within the group by accessing any of the devices within the group.

Figure 1:
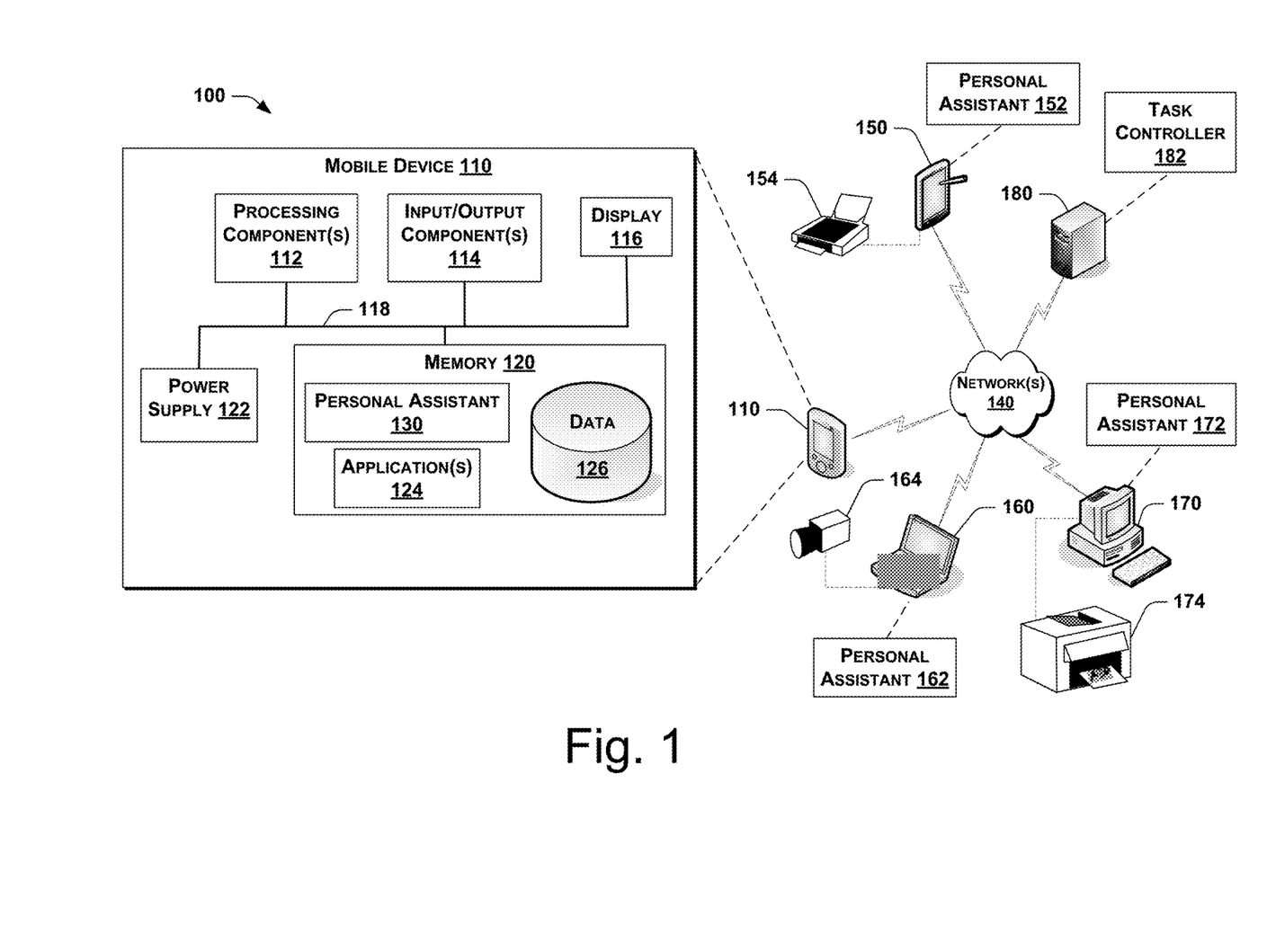
FIG. 1 shows an embodiment of an environment for cross-device task execution.

FIG. 1 shows an embodiment of an environment 100 for cross-device task execution in accordance with the present disclosure. In this embodiment, the environment 100 includes a mobile device 110 that includes one or more processing components 112, one or more input/output (I/O) components 114, and a display 116 operatively coupled to a memory 120 by a bus 118. A power supply 122 provides power to the components of the mobile device 110, allowing the mobile device 110 to be portable. In the embodiment shown in FIG. 1, the memory 120 stores one or more applications 124 that provide one or more functionalities or capabilities for the mobile device 110 (e.g. voice recognition software, mapping software, virus scanning software, etc.), data 126 (e.g. contact list, photos, email, texts, instant messages, etc.), and a personal assistant 130.

In at least some embodiments, the mobile device 110 may be a telephone or other similar portable communication device, and the personal assistant 130 is software application that accepts input from a user and performs tasks or services for the user based on such input. In at least some implementations, the personal assistant 130 may be configured with voice recognition capabilities such that a user may provide spoken inputs to the personal assistant 130 (e.g. via the I/O components 114), however, in other implementations, the user may provide inputs to the personal assistant 130 using one or more conventional, non-verbal input techniques (e.g. keyboard, mouse, touch-screen, etc.).

More specifically, in at least some implementations, the personal assistant 130 may at least partially imitate a human assistant by having information regarding one or more affinities or preferences of the user, the user's environment, and the user's devices, and may make suggestions to the user, or may make assumptions about one or more user preferences, based on such information. For example, in at least some implementations, the personal assistant 130 may be a version or derivative of a commercially-available software application such as Cortana™ produced by Microsoft, Siri® produced by Apple, Google Now by Google, Inc., Speaktoit by Speaktoit, Inc., Quip produced by Quip, Inc., or any other suitable personal assistant application.

The mobile device 110 shown in FIG. 1 may represent a variety of possible device types, including but not limited to a handheld device, such as a cellular telephone, a Personal Data Assistant (PDA), a notebook computer, a tablet computer, a slate computer, a laptop computer, a smart watch, or any other handheld device. It should be understood, however, that the device 110 is not limited to a handheld device, and may represent a server, a mainframe, a workstation, a distributed computing device (e.g. a control component of a distributed computing device), a portion of a larger device or system, or any other suitable type of device. In still other embodiments, the device 110 may be a television, a wearable device, a vehicle (or portion of a vehicle), an appliance (or portion of an appliance), a consumer product, or virtually any other suitable device.

As further shown in FIG. 1, the mobile device 110 may communicate with one or more other devices (e.g. via I/O components 114), either directly or indirectly via one or more networks 140 (e.g. cellular network, global communication network, Local Area Network (LAN), Wide Area Network (WAN), wired or wireless network, etc.), including, for example, a tablet device 150, a mobile computing device 160 (e.g. laptop, notebook, etc.), a desktop computing device 170, a server 180, or any other suitable device. Stored on the tablet device 150 is a version of a tablet personal assistant 152 that is operationally suited for the tablet device 150. Similarly, in the illustrative implementation shown in FIG. 1, the laptop device 160 includes a laptop personal assistant 162 that is operationally suited for the laptop device 160, and the desktop computing device 170 includes a desktop personal assistant 172 that is operationally suited for the desktop computing device 170. In at least some implementations, there may be one or more differences between the versions and capabilities of the various personal assistants 130, 152, 162, 172, however, in still other implementations, there may be no differences between the various personal assistants 130, 152, 162, 172. In the implementation shown in FIG. 1, the server 180 includes a task controller 182 that operatively communicates with the various personal assistants 130, 152, 162, 172 of the various networked devices 110, 150, 160, 170 to perform one or more cross-device task execution operations, as described more fully below.

It will be appreciated that the various devices 150, 160, 170, 180 that may communicate with the mobile device 110 via the one or more networks 140 typically have different capabilities that may be due to various factors, including, for example, processing capability (e.g. processing speed, workload, etc.), memory availability and memory type (e.g. cache, RANI, etc.), software availability and type (e.g. functionalities of applications, license restrictions, compatibilities, etc.), hardware availability and type (e.g. peripherals, etc), power availability (e.g. constant power source, battery, etc.), data availability and type (e.g. databases, personal data, business data, proprietary data, etc.), and network connection (e.g. bandwidth, wired or wireless, signal strength, etc.), and other possible distinguishing factors.

To demonstrate one type of different capabilities of the networked devices 110, 150, 160, 170, 180, in the illustrative implementation shown in FIG. 1, the devices 150, 160, 170 are shown as being associated with different peripheral devices. More specifically, the tablet device 150 is operatively coupled to a black and white printer 154, the laptop device 160 is operatively coupled to a camera 164, and the desktop computing device 170 is operatively coupled to a multi-purpose device 174 having color printing, scanning, and facsimile (or faxing) capabilities. Of course, the devices 150, 160, 170 may have other different capabilities from the mobile device 110 (and from each other), including one or more of the various distinguishing factors described above (e.g. processing capability, memory, software, hardware, power, data, network connectivity, etc.). Similarly, although the server 180 is not depicted as having an attached peripheral device, it will be appreciated that the server 180 may also have one or more of the various distinguishing factors described above (e.g. processing capability, memory, software, hardware, power, data, network connectivity, etc.).

In at least some implementations, the display 116 of the mobile device 110 (or the other devices 150, 160, 170) may include one or more aspects of a Natural User Interface (NUI) that enables a user to interact with the mobile device 110 in a "natural" manner, free from artificial constraints imposed by conventional input devices such as mice, keyboards, remote controls, and the like. For example, in at least some embodiments, an NUI may rely on speech recognition, touch and stylus recognition, gesture recognition both on the display 116 and adjacent to the display 116, air gestures (e.g. hand movement, wave, point, snap, nod, finger gesture, etc.), head and eye (or gaze) tracking, voice and speech, vision, touch, hover (e.g. maintaining position of finger or stylus proximate to a relevant portion of an interface or other location for a specified period, etc.), gestures, machine intelligence (e.g. pattern recognition, Bayesian learning algorithms, inductive learning algorithms, inference algorithms, etc.), as well as technologies for sensing brain activity using electric field sensing electrodes (electroencephalogram (EEG) techniques and related methods) to receive a wide variety of inputs to the mobile device 110.

Figure 2:
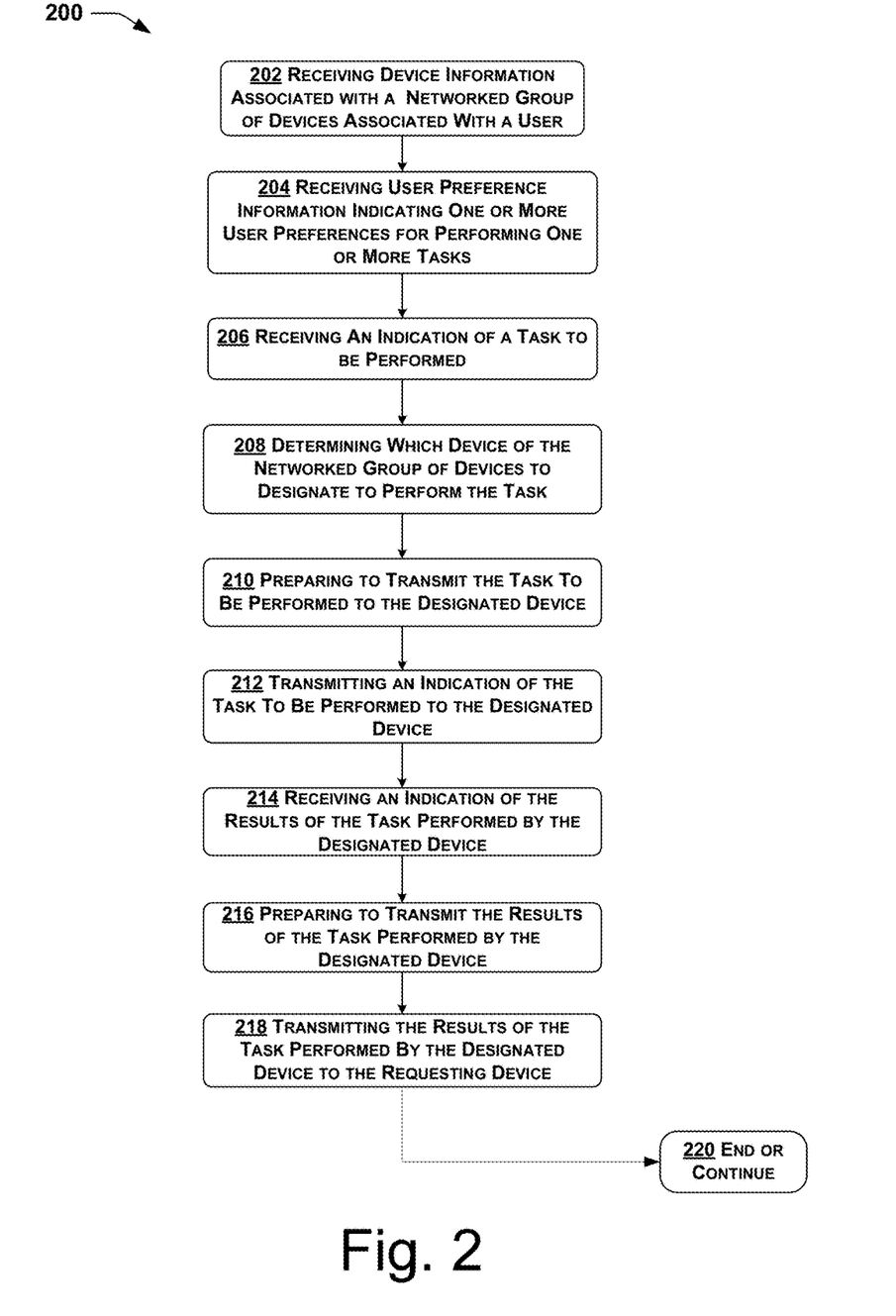
FIG. 2 shows an embodiment of a process for cross-device task execution.

FIG. 2 shows an embodiment of a process 200 for cross-device task execution in accordance with the present disclosure. In general, the process 200 may be performed by the task controller 182 hosted by the server 180 depicted in FIG. 1. It will be appreciated, however, that in alternate implementations, the process 200 may be performed by one or more other devices of the group of networked devices 110, 150, 160, 170, 180 shown in FIG. 1.

In the embodiment shown in FIG. 2, the process 200 for cross-device task execution includes receiving device information associated with a networked group of devices associated with a user at 202. For example, in at least some implementations, the receiving device information from a networked group of devices (at 202) may include the task controller 182 of the server 180 receiving a device identification information (e.g. device identifier, device ID number, serial number, etc.) associated with each of the networked devices 110, 150, 160, 170 of the environment 100, version information regarding a version of the personal assistant 130, 152, 162, 172 that is associated with each of the respective networked devices 110, 150, 160, 170, and also capability information regarding one or more capabilities of each of the networked devices 110, 150, 160, 170. For example, in at least some implementations, the device information received by the task controller 182 (at 202) may include device capability information for one or more of the networked devices 110, 150, 160, 170, including one or more of processing capability (e.g. processing speed, workload, etc.), memory availability and memory type (e.g. cache, RAM, etc.), software availability and type (e.g. functionalities of applications, license restrictions, compatibilities, etc.), hardware availability and type (e.g. peripherals, etc), power availability (e.g. constant power source, battery, etc.), data availability and type (e.g. databases, personal data, business data, proprietary data, etc.), and network connection (e.g. bandwidth, wired or wireless, signal strength, etc.), and other possible capabilities.

Some or all of the device information received by the task controller 182 (at 202) may be received as an initial registration of each device with the task controller 182, such as when each device 110, 150, 160, 170 is powered on or connects to the one or more networks 140, or may be provided periodically (e.g. hourly or daily confirmations or updates), or may be provided on an ad hoc basis, such as when one or more capabilities change in an appreciable way (e.g. adding or removing hardware, adding or removing memory, changes in network connectivity, etc.), or in any suitable combination of ways. In at least some implementations, one or more capabilities of the server 180 hosting the task controller 182 may also be known by the task controller 182 (or provided to the task controller 182) to be part of the pooled capabilities of the environment 100. Alternately, the server 180 may merely host the task controller 182 to perform one or more operations for cross-device task execution as described herein, and one or more other capabilities of the server 180 may not otherwise be available for cross-device task execution.

As further shown in FIG. 2, the process 200 for cross-device task execution further includes receiving user preference information indicating one or more user preferences for performing one or more tasks at 204. For example, in at least some implementations, using the personal assistant 130 of the mobile device 110, a user may initially input a series of tasks that the user may wish to perform (e.g. printing a black and white printout, capturing a photograph or video, printing a color printout, sending a facsimile transmission, etc.), and may also indicate their preference for which of the devices 110, 150, 160, 170 to employ for such tasks (e.g., tablet device 150 for black and white printing, laptop device 160 for capturing images or video, desktop computer device 170 for color printing or faxing, etc.). In at least some implementations, the personal assistant 130 may provide a menu of possible tasks for the user to select from, as well as a list of available and suitable networked devices 150, 160, 170, 180 from which to choose to establish the user's preferences. The user preference information provided by the user may then be received by the task controller 182 (at 204) and stored for future reference. The user preference information may also be stored by personal assistant 130 of the device within the memory 120 (e.g. within the data 126) for future reference by the personal assistant 130.

With continued reference to FIG. 2, the process 200 for cross-device task execution further includes receiving an indication of a task to be performed at 206. More specifically, in at least some implementations, the receiving an indication of a task to be performed (at 206) may include the task controller 182 hosted by the server 180 receiving a request for a particular task from the personal assistant 130 of the mobile device 110, along with task information including any input parameters required for performance of the task. For example, for an embodiment wherein the one or more applications 124 on the memory 120 of the mobile device 110 includes an electronic mail messaging application, the user may ask the personal assistant 130 to print a black and white copy of a received email message. In at least some implementations, the personal assistant 130 may receive the user's request to perform a particular task (i.e. print black and white copy of email message), check the user preference information (e.g. stored within the data 126) and determine that the particular task is not to be performed on the mobile device 110, and transmit the user's request to perform the particular task to the task controller 182 on the server 180. The task controller 182 then receives the indication of the task to be performed from the mobile device 110 (at 206).

The process 200 for cross-device task execution (FIG. 2) further includes determining which device of the networked group of devices to designate to perform the task at 208. In at least some implementations, the determining which device to designate to perform the task (at 208) may include the task controller 182 analyzing and interpreting the task to be performed, such as determining the requesting device (e.g. determining that device identifier associated with mobile device 110 has requested a black and white printout of an email message), accessing the user preference information to determine which of the networked devices 150, 160, 170, 180 should be designated to perform the requested task (e.g. user prefers the tablet computer 150 for performing black and white printing tasks), and accessing the device information to determine relevant device information for the preferred or designated device. More specifically, in at least some implementations, the accessing device information to determine relevant device information for the designated device includes determining a device identifier for device that is designated to perform the task (e.g. the tablet device 150), confirming whether the designated device (e.g. tablet device 150) still has the capability to perform the requested task (e.g. black and white print capability), and determining the relevant version of the personal assistant operating on the designated device (e.g. personal assistant 152 on the tablet device 150) that will be receiving the assigned task.

In at least some implementations, determining which device of the networked group of devices to designate to perform the task at 208 may include determining whether the user preference information indicates that the requesting device should be the designated device, and selecting the requesting device as the designated device to perform the task. Alternately, in at least some implementations, determining which device of the networked group of devices to designate to perform the task at 208 may include determining whether the requesting device is capable of performing the task; if the user preference information indicates a different device other than the requesting device to perform the task, selecting the designated device based on the user preference information; and if the user preference information does not indicate the different device other than the requesting device to perform the task, selecting the requesting device as the designated device to perform the task.

In at least some other implementations, if the user preference information does not specify which device the user prefers to perform the requested task, the determining which device to designate to perform the task (at 208) may include analyzing the capabilities of the various networked devices 150, 160, 170, 180 to assess which device(s) are capable of performing the desired task. If only one of the networked devices 150, 160, 170, 180 is capable of performing the requested task, then that device is designated to perform the requested task.

As further shown in FIG. 2, the process 200 for cross-device task execution further includes preparing to transmit the task to be performed to the designated device at 210. In at least some implementations, the preparing to transmit the task to the designated device (at 210) may include, if necessary, mapping the indication of the task to be performed that was received from the requesting device (at 206) to a form suitable for the designated device that will perform the task (determined at 208). For example, with reference to the illustrative example set forth above, the task controller 172 of the server 170 may map the request to print a black and white copy of an email received from the personal assistant 130 of the mobile device 110 to a form suitable to be received and understood (or interpreted) by the personal assistant 152 of the tablet device 150. It may also be necessary for the task controller 182 to map any information required for performance of the task (e.g. input parameters received with the task request at 206) into a form suitable to be received and understood (or interpreted) by the personal assistant 152 of the tablet device 150.

Next, the process 200 for cross-device task execution further includes transmitting an indication of the task to be performed to the designated device at 212. In at least some implementations, the transmitting of the indication of the task to be performed (at 212) includes transmitting a task identifier (e.g. task identification number, task descripter, etc.) associated with the task to be performed, along with any information required for performance of the task (e.g. input parameters received with the task request at 206). Thus, with reference to the illustrative example set forth above, the task controller 172 of the server 170 may transmit a suitably mapped request to the personal assistant 152 of the tablet device 150 to print a black and white copy of an email message, along with a suitably mapped version of the email message that is intended to be printed, and along with a task identifier that suitably identifies the requested task.

With continued reference to FIG. 2, the process 200 for cross-device task execution further includes receiving an indication of the results of the task performed by the designated device at 214. In at least some implementations, the receiving an indication of the results (at 214) includes receiving the task identifier (e.g. task identification number, task descripter, etc.) associated with the task, along with receiving one or more actual results of the task performed by the designated device (e.g. one or more calculations, processing operations, etc.), while in other implementations, the receiving an indication of the results (at 214) includes simply an indication that the task was successfully completed (or not successfully completed). For example, in the illustrative example, after the tablet device 150 causes the email message to be printed on the black and white printer 154, the personal assistant 152 of the tablet device 150 may transmit and indication to the task controller 182 that the black and white printing has been successfully completed.

The process 200 for cross-device task execution (FIG. 2) further includes preparing to transmit the results of the task performed by the designated device at 216. More specifically, in at least some implementations, the preparing the results of the task (at 216) may include determining from the task identifier the device identifier of the requesting device that initially requested the performance of the task (at 206), and then (if necessary) mapping the indication of the task results received from the designated device (received at 214) to a form suitable for the personal assistant of the requesting device to receive and interpret (or understand). For example, in the illustrative example set forth above, the task controller 172 of the server 170 may map the indication that the email message has been successfully printed by the black and white printer 154 received from the personal assistant 152 of the tablet device 150 to a form suitable to be received and understood (or interpreted) by the personal assistant 130 of the mobile device 110.

As further shown in FIG. 2, the process 200 for cross-device task execution further includes transmitting the results of the task performed by the designated device to the requesting device at 218. As noted above, the requesting device is determined from the device identifier associated with the requested task (received at 206). For example, in the illustrative example set forth above, the task controller 172 of the server 170 may transmit the indication that a black and white copy of the email message has been successfully printed to the personal assistant 130 of the mobile device 110. Finally, the process 200 includes ending or continuing to other operations at 220.

It will be appreciated that techniques and technologies for cross-device task execution as disclosed herein may provide substantial operational improvements in comparison with conventional technologies. For example, techniques and technologies for cross-device task execution in accordance with the present disclosure may advantageously enable a user to pool the capabilities of all of the user's different devices into a readily-accessible group of networked devices that can operatively communicate via personal assistant software, allowing the user to access all of the different capabilities of all of the various networked devices from any device of the group, thereby providing improved operational efficiencies over conventional techniques. With respect to the above-described example of printing a black and white copy of an email message, using the efficient techniques and technologies disclosed herein, the user is not required to forward the email message to the tablet device 150, then log on to the tablet device 150, activate email messaging software, receive the email message, and then enter commands to print the email message. In this way, considerable improvements in processing efficiency, reduced processing requirements, and reduced power consumption may be achieved by techniques and technologies in accordance with the present disclosure. These advantages may further translate into less wear and tear on processors, display components, circuitry, battery, and other components of networked devices, thereby prolonging useful life and operability of such devices. In addition, user satisfaction may be increased by allowing improved access to capabilities of a group of devices from any one particular device.

Techniques and technologies for cross-device task execution in accordance with the present disclosure are not necessarily limited to the particular embodiments described above with reference to FIGS. 1-2. In the following description, additional embodiments of techniques and technologies for cross-device task execution will be described. It should be appreciated that the embodiments described herein are not intended to be exhaustive of all possible embodiments in accordance with the present disclosure, and that additional embodiments may be conceived based on the subject matter disclosed herein. For example, it should be appreciated that at least some of the various components and aspects of the described embodiments may be eliminated to create additional embodiments, or may be variously combined or re-ordered to create still further embodiments. In the following discussion of additional embodiments, common reference numerals may be used to refer to elements introduced above, and for the sake of brevity, descriptions of previously-introduced elements may be omitted so that emphasis can be properly placed on new or varying aspects of such additional embodiments.

Figure 3:
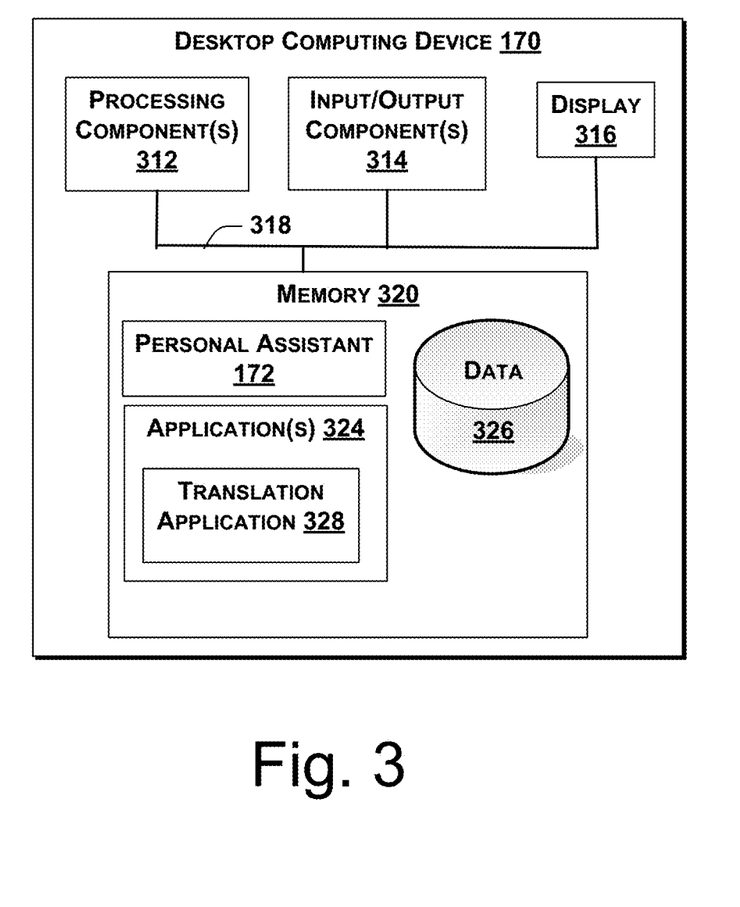
FIG. 3 shows an embodiment of a desktop computing device for cross-device task execution.

For example, FIG. 3 shows an embodiment of the desktop computing device 170 of FIG. 1 that may be used for cross-device task execution. In this implementation, the desktop computing device 170 includes one or more processing components 312, one or more input/output (I/O) components 314, and a display 316 operatively coupled to a memory 320 by a bus 318. The memory 320 stores one or more applications 324 that provide one or more functionalities or capabilities for the desktop computing device 170 (e.g. voice recognition software, email messaging software, text messaging software, etc.), and data 328 (e.g. contact list, photos, email, texts, instant messages, etc.). As described above, the desktop computing device 170 further includes the personal assistant 172 that is suitable for the desktop computing device 170. In the embodiment shown in FIG. 3, the desktop computing device 170 further includes a translation application 328 that is configured to translate a written document from a first language to a second language (e.g. from French to English, from German to Telugu, etc.).

Figure 4:
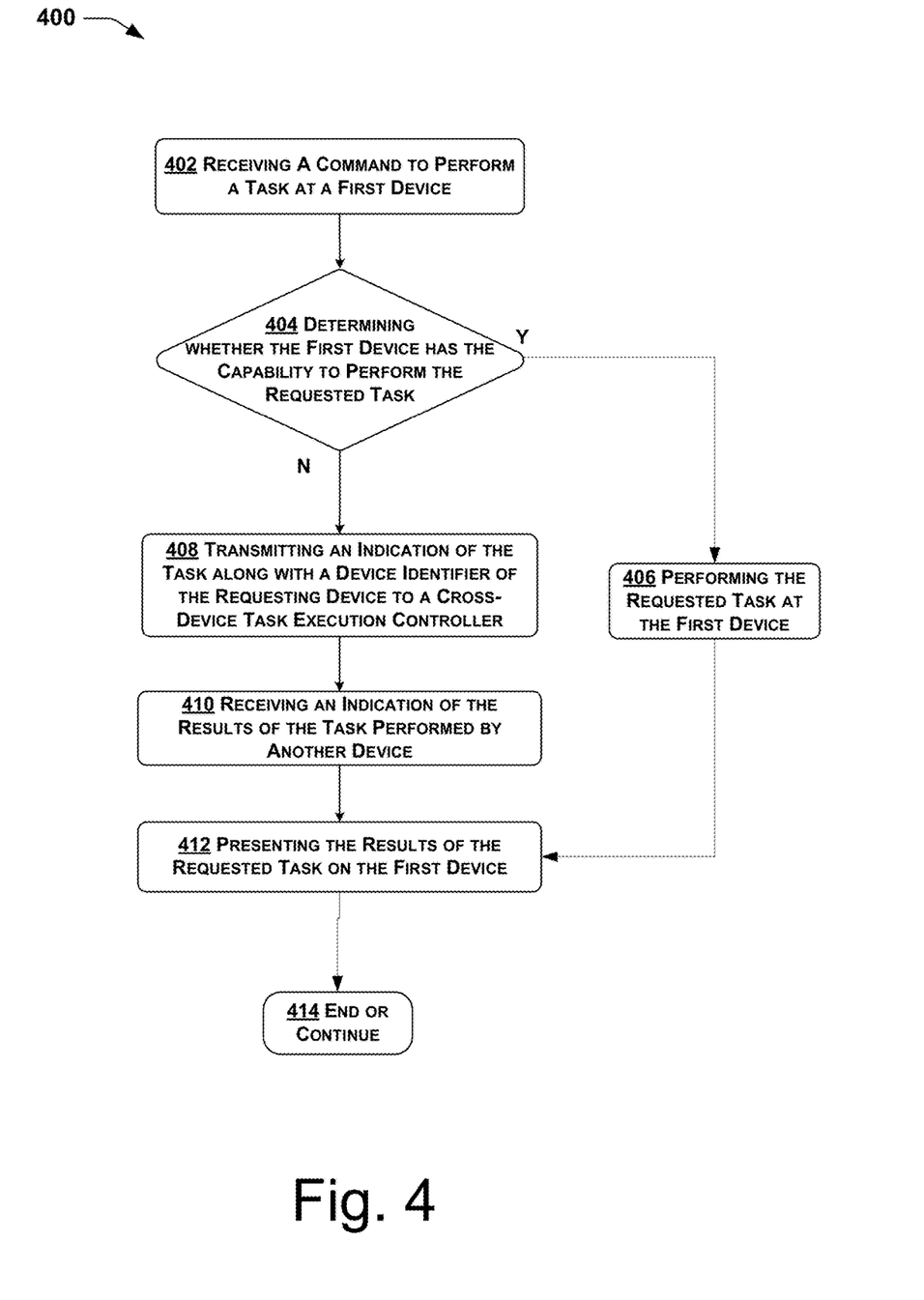
FIG. 4 shows another embodiment of a process for cross-device task execution.

FIG. 4 shows another embodiment of a process 400 for cross-device task execution in accordance with the present disclosure. In general, the process 400 may be performed by the mobile device 110 depicted in FIG. 1. It will be appreciated, however, that in alternate implementations, the process 400 may be performed by one or more other devices of the group of networked devices 110, 150, 160, 170, 180 shown in FIG. 1.

In the embodiment shown in FIG. 4, the process 400 for cross-device task execution includes receiving a command to perform a task at a first device at 402. For example, with reference to FIG. 1, in at least some implementations, the receiving a command to perform a task at a first device at 402 may include the personal assistant 130 of the mobile device 110 receiving a request from a user to translate a document from French to English. The command may be received by a speech recognition portion of the personal assistant 130, by a typed input, by one or more selections from a menu of possible task options, or in any suitable way or combination of ways.

At 404, the process 400 for cross-device task execution further includes determining whether the first device has the capability to perform the requested task at 404. For example, with reference to FIG. 1, the determining (at 404) may include the mobile device 110 determining whether the applications 124 stored in the memory 120 include a translation application. If it is determined (at 404) that the first device has the capability to perform the requested task, then the process 400 includes performing the requested task at the first device at 406 (e.g. the mobile device 110 performing the requested translation of the document from French to English), and then presenting the results of the requested task on the first device at 412 (e.g. displaying the requested English translation of the document on the display 226 of the mobile device 110).

Alternately, as further shown in FIG. 4, if it is determined (at 404) that the first device does not have the capability to perform the requested task, then the process 400 further includes transmitting an indication of the task along with a device identifier of the requesting device to a cross-device task execution controller at 408. For example, in at least some implementations, the transmitting (at 404) may include the mobile device 110 transmitting the request to translate the document from French to English, along with the document and a device identification number, to the task controller 182 of the server 180 via the one or more networks 140 (FIG. 1).

The task controller 182 of the server 180 may then perform a process for cross-device task execution in accordance with the present disclosure, such as the process 200 described above with reference to FIG. 2 (or a suitable portion thereof), to determine which of the networked devices 150, 160, 170 to assign to perform the requested task. More specifically, in at least some implementations, the task controller 182 of the server 180 may determine that the desktop computing device 170 includes the translation application 328 (FIG. 3), and may therefore perform one or more of the operations of the process 200 described above to cause the requested task of translating the document from French to English to be performed by the desktop computing device 170, and may provide the results of the translation application 328 back to the requesting mobile device 110 via the one or more networks 140.

Referring again to FIG. 4, the process 400 for cross-device task execution 400 further includes receiving an indication of the results of the task performed by another device at 410. For example, in at least some implementations, the receiving (at 410) may include the mobile device 110 receiving the results of the requested translation (e.g. the English translation of the document) back from the task controller 182 of the server 180 via the one or more networks 140.

At 412, the process 400 further includes presenting the results of the requested task on the first device. For example, the presenting (at 412) may include the English translation of the document being displayed on the display 116 of the mobile device 110, or audibly played on a speaker of the mobile device 110, or any other suitable presentation method. Finally, the process 400 ends of continues to other operations at 414. Thus, it should be appreciated that the above-described advantages of techniques and technologies for cross-device task execution in accordance with the present disclosure may be achieved through pooling of both the hardware capabilities and the software functionalities of a group of networked devices.

Figure 5:
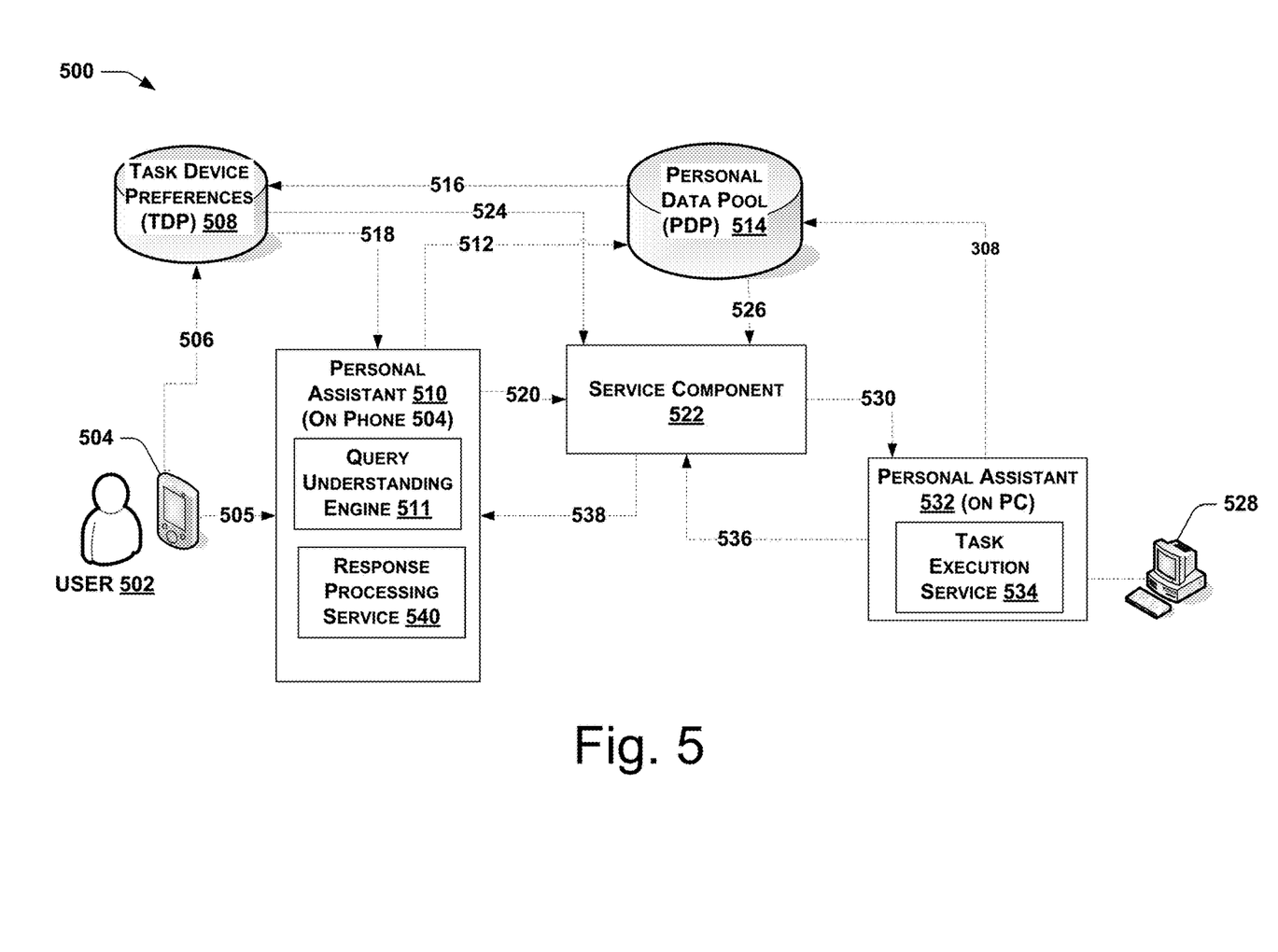
FIG. 5 shows another embodiment of an environment for cross-device task execution.

FIG. 5 shows another embodiment of an environment 500 for cross-device task execution in accordance with the present disclosure. In this embodiment, the environment 500 includes a user 502 operating a phone 504 to perform cross-device task execution operations. More specifically, at 506, the user 502 indicates their preferences for which tasks are to be performed on which associated devices, which information is stored as task defined preferences (TDP) 508. In at least some implementations, the TDP 508 may be stored on the phone 504, while in alternate implementations, the TDP 508 may be stored on any other suitable device of the environment 500 (e.g. one or more of the devices 150, 160, 170, 180 of FIG. 1). In addition, the user 502 interacts with a personal assistant 510 installed on the phone 504 to provide one or more tasks at 505 for execution by the environment 500.

As shown in FIG. 5, in at least some implementations, the personal assistant 510 installed on the phone 504 may include a query understanding engine 511 that receives tasks input by the user 502 (e.g. spoken commands using voice recognition, etc.). More specifically, in at least some implementations, the query understanding engine 511 may perform a voice-to-text conversion of the requested task (at 505), and may then interpret the text and map the text to determine a corresponding task. One illustrative example of a personal assistant 510 having such query understanding capabilities is the Cortana™ personal assistant software, commercially available from the Microsoft Corporation of Redmond, Wash.

At one or more suitable times, such as when the phone 504 is turned on or connects (or re-connects) to a network, the instance of the personal assistant 510 is registered at 512 with a user's personal data pool (PDP) 514. In at least some implementations, the PDP 514 stores information regarding the instances and capabilities of a plurality of devices associated with the user 502. In further implementations, the PDP 514 may store information associated with a plurality of users and their associated devices. In at least some implementations, at 516, the personal data pool (PDP) 514 may share information to the task device preferences (TDP) 508 to facilitate one or more cross-device task execution operations described herein.

In the embodiment shown in FIG. 5, upon receiving a task from the user 502, the personal assistant 510 may receive (e.g. pull) information at 518 from the user's task device preferences (TDP) 508 to determine whether to perform the task using the phone 504 or one of the user's other devices. Once the personal assistant 510 determines that the task is not to be performed on the phone 504, then at 520, the task is transmitted to a service component 522 that facilitates one or more cross-device task execution operations. More specifically, in at least some implementations, the omni service component 522 may analyze the task incoming (at 520) from the phone 504 (which may include a device identifier associated with the phone 504), receive (e.g. pull) information at 524 associated with the user 502 from the task device preferences (TDP) 508, and receive (e.g. pull) information at 526 from the personal data pool (PDP) 514. Using this information, the service component 522 may determine which personal assistant (and associated device) of the user's group of networked devices (e.g. devices 150, 160, 170, 180 as shown in FIG. 1) to invoke to perform the requested task.

In at least some implementations, if the task device preference (TDP) 508 information does not specify which device the user 502 prefers to perform the requested task, the service component 522 may determine which device to designate to perform the task by analyzing the capabilities of the various networked devices (e.g. devices 150, 160, 170, 180 of FIG. 1) to assess which device(s) are capable of performing the desired task. If only one of the networked devices is capable of performing the requested task, then that device is designated to perform the requested task by the service component 522.

In the embodiment shown in FIG. 5, the service component 522 has determined that the task should be performed by a personal computer (PC) 528. Thus, at 530, the service component 522 provides the task to a personal assistant 532 installed on the personal computer 528. In at least some implementations, the service component 522 provides a task identifier and the device identifier of the requesting device (i.e. the device identifier of the phone 504) along with the requested task (at 530) to the personal computer 528. In addition, in at least some implementations, the service component 522 may monitor a status of the requested task so that the service component 522 can obtain one or more status updates on the performance of the requested task for presentation to the user 502 on the requesting phone 504.

It will be appreciated that the personal data pool (PDP) 514 and the service component 522 may be implemented in a variety of suitable ways. For example, in at least some implementations, the personal data pool (PDP) 514 and the service component 522 may be installed on a single device (e.g. the server 180 of FIG. 1), and may be available to the phone 504 and to the personal computer 528 via one or more networks (e.g. the networks 140 of FIG. 1). Alternately, the personal data pool (PDP) 514 may be stored on first device and the service component 522 may be installed on a second device, and may communicate with each other and with the phone 504 and the personal computer 528 via one or more networks. And in still other implementations, the personal data pool (PDP) 514 and the service component 522 may be installed on one or more of the various networked devices that are also part of a group of networked devices that may perform one or more tasks (e.g. personal computer 528 of FIG. 5, or devices 150, 160, 170 of FIG. 1, etc.).

Referring again to FIG. 5, in at least some implementations, the personal assistant 532 includes a task execution service 534 that performs the requested task (or causes the personal computer 528 to perform the requested task). The task execution service 534 may also provide status information to the service component 522 regarding the status of the performance of the requested task (e.g. queued for execution, currently executing, percentage completed, completed, etc.). As indicated in FIG. 5, at 536, the task execution service 534 provides status information, and/or the results of the task execution, to the service component 522. In turn, at 538, the service component 522 provides the status information and/or the results of the task execution to the personal assistant 510 on the phone 504. More specifically, in at least some implementations, the service component 522 may receive from the task execution service 534 the results of the requested task (or status information about the requested task) including the task identifier and the device identifier of the requesting device (i.e. the phone 504), and based on the task identifier and the device identifier, may provide the requesting device (i.e. the phone 504) with the results (or status information) at 538. In at least some implementations, a response processing service 540 of the personal assistant 510 installed on the phone 504 receives the results (or the status information) from the service component 522 (at 538), and notifies the user 502 of the results (or status) of the requested task (e.g. by visual display of the results, by audio indication, by vibration, etc.).

In general, techniques and technologies disclosed herein for cross-device task execution may be described in the general context of computer code or machine-useable instructions, including computer-executable instructions such as program modules, being executed by a computer or other device. Generally, program modules including routines, programs, objects, components, data structures, etc., refer to code that perform particular tasks or implement particular abstract data types. Various embodiments of the invention may be practiced in a variety of system configurations, including hand-held devices, consumer electronics, general-purpose computers, more specialty computing devices, etc. In addition, various embodiments of the invention may also be practiced in distributed computing environments (e.g. cloud-based computing systems) where tasks are performed by remote-processing devices that are linked through a communications network.

Figure 6:
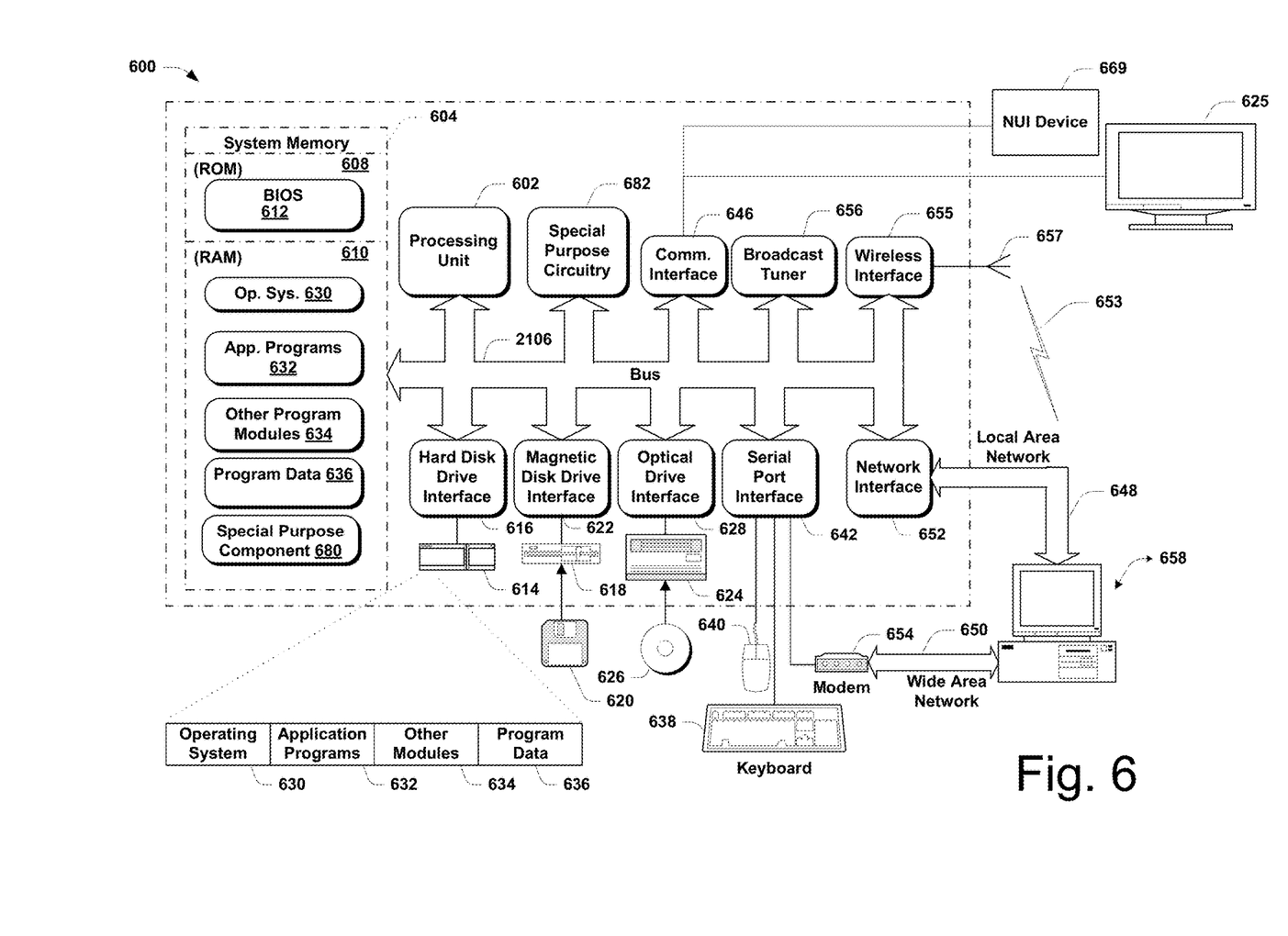
FIG. 6 shows an embodiment of a computer system for cross-device task execution.

Furthermore, techniques and technologies disclosed herein for cross-device task execution may be implemented on a wide variety of devices and platforms. For example, FIG. 6 shows an embodiment of a computer system 600 that may be employed for cross-device task execution. As shown in FIG. 6, the example computer system environment 600 includes one or more processors (or processing units) 602, special purpose circuitry 682, memory 604, and a bus 606 that operatively couples various system components, including the memory 604, to the one or more processors 602 and special purpose circuitry 682 (e.g., Application Specific Integrated Circuitry (ASIC), Field Programmable Gate Array (FPGA), etc.).

The bus 606 may represent one or more of any of several types of bus structures, including a memory bus or memory controller, a peripheral bus, an accelerated graphics port, and a processor or local bus using any of a variety of bus architectures. In at least some implementations, the memory 604 includes read only memory (ROM) 608 and random access memory (RAM) 610. A basic input/output system (BIOS) 612, containing the basic routines that help to transfer information between elements within the system 600, such as during start-up, is stored in ROM 608.

The example system 600 further includes a hard disk drive 614 for reading from and writing to a hard disk (not shown), and is connected to the bus 606 via a hard disk driver interface 616 (e.g., a SCSI, ATA, or other type of interface). A magnetic disk drive 618 for reading from and writing to a removable magnetic disk 620, is connected to the system bus 606 via a magnetic disk drive interface 622. Similarly, an optical disk drive 624 for reading from or writing to a removable optical disk 626 such as a CD ROM, DVD, or other optical media, connected to the bus 606 via an optical drive interface 628. The drives and their associated computer-readable media may provide nonvolatile storage of computer readable instructions, data structures, program modules and other data for the system environment 600. Although the system environment 600 described herein employs a hard disk, a removable magnetic disk 620 and a removable optical disk 626, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

The computer-readable media included in the system memory 600 can be any available or suitable media, including volatile and nonvolatile media, and removable and non-removable media, and may be implemented in any method or technology suitable for storage of information such as computer-readable instructions, data structures, program modules, or other data. More specifically, suitable computer-readable media may include random access memory (RAM), read only memory (ROM), electrically erasable programmable ROM (EEPROM), flash memory or other memory technology, compact disk ROM (CD-ROM), digital versatile disks (DVD) or other optical disk storage, magnetic cassettes, magnetic tape, magnetic disk storage or other magnetic storage devices, or any other medium, including paper, punch cards and the like, which can be used to store the desired information. As used herein, the term "computer-readable media" is not intended to include transitory signals.

As further shown in FIG. 6, a number of program modules may be stored on the memory 604 (e.g., the ROM 608 or the RAM 610) including an operating system 630, one or more application programs 632, other program modules 634, and program data 636 (e.g., the data store 620, image data, audio data, three dimensional object models, etc.). Alternately, these program modules may be stored on other computer-readable media, including the hard disk, the magnetic disk 620, or the optical disk 626. For purposes of illustration, programs and other executable program components, such as the operating system 630, are illustrated in FIG. 6 as discrete blocks, although it is recognized that such programs and components reside at various times in different storage components of the system environment 600, and may be executed by the processor(s) 602 or the special purpose circuitry 682 of the system environment 600.

A user may enter commands and information into the system environment 600 through input devices such as a keyboard 638 and a pointing device 640. Other input devices (not shown) may include a microphone, joystick, game pad, satellite dish, scanner, or the like. Still other input devices, such as a Natural User Interface (NUI) device 669, or user interface 625, include or involve one or more aspects of a Natural User Interface (NUI) that enables a user to interact with the system environment 600 in a "natural" manner, free from artificial constraints imposed by conventional input devices such as mice, keyboards, remote controls, and the like. For example, in at least some embodiments, the NUI device 669 may rely on speech recognition, touch and stylus recognition, one or more biometric inputs, gesture recognition both on screen and adjacent to the screen, air gestures, head and eye (or gaze) tracking, voice and speech, vision, touch, hover, gestures, machine intelligence, as well as technologies for sensing brain activity using electric field sensing electrodes (EEG and related methods) to receive inputs. In addition, in at least some embodiments, an NUI may involve or incorporate one or more aspects of touch sensitive displays, voice and speech recognition, intention and goal understanding, motion gesture detection using depth cameras (such as stereoscopic or time-of-flight camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface.

These and other input devices are connected to the processing unit 602 and special purpose circuitry 682 through an interface 642 or a communication interface 646 (e.g. video adapter) that is coupled to the system bus 606. A user interface 625 (e.g., display, monitor, or any other user interface device) may be connected to the bus 606 via an interface, such as a video adapter 646. In addition, the system environment 600 may also include other peripheral output devices (not shown) such as speakers and printers.

The system environment 600 may operate in a networked environment using logical connections to one or more remote computers (or servers) 658. Such remote computers (or servers) 658 may be a personal computer, a server, a router, a network PC, a peer device or other common network node. The logical connections depicted in FIG. 6 include one or more of a local area network (LAN) 648 and a wide area network (WAN) 650. Such networking environments are commonplace in offices, enterprise-wide computer networks, intranets, and the Internet. In this embodiment, the system environment 600 also includes one or more broadcast tuners 656. The broadcast tuner 656 may receive broadcast signals directly (e.g., analog or digital cable transmissions fed directly into the tuner 656) or via a reception device (e.g., via an antenna 657, a satellite dish, etc.).

When used in a LAN networking environment, the system environment 600 may be connected to the local area network 648 through a network interface (or adapter) 652. When used in a WAN networking environment, the system environment 600 typically includes a modem 654 or other means (e.g., router) for establishing communications over the wide area network 650, such as the Internet. The modem 654, which may be internal or external, may be connected to the bus 606 via the serial port interface 642. Similarly, the system environment 600 may exchange (send or receive) wireless signals 653 with one or more remote devices using a wireless interface 655 coupled to a wireless communicator 657 (e.g., an antenna, a satellite dish, a transmitter, a receiver, a transceiver, a photoreceptor, a photodiode, an emitter, a receptor, etc.).

In a networked environment, program modules depicted relative to the system environment 600, or portions thereof, may be stored in the memory 604, or in a remote memory storage device. More specifically, as further shown in FIG. 6, a special purpose component 680 may be stored in the memory 604 of the system environment 600. The special purpose component 680 may be implemented using software, hardware, firmware, or any suitable combination thereof. In cooperation with the other components of the system environment 600, such as the processing unit 602 or the special purpose circuitry 682, the special purpose component 680 may be operable to perform one or more implementations of techniques described above (e.g., example process 200 of FIG. 2, process 400 of FIG. 4, etc.).

Generally, application programs and program modules executed on the system environment 600 may include routines, programs, objects, components, data structures, etc., for performing particular tasks or implementing particular abstract data types. These program modules and the like may be executed as a native code or may be downloaded and executed, such as in a virtual machine or other just-in-time compilation execution environments. Typically, the functionality of the program modules may be combined or distributed as desired in various implementations.

In view of the disclosure of techniques and technologies for cross-device task execution as disclosed herein, a few representative embodiments are summarized below. It should be appreciated that the following summary of representative embodiments is not intended to be exhaustive of all possible embodiments, and that additional embodiments may be readily conceived from the disclosure of techniques and technologies provided herein.

For example, in at least some implementations, a system for cross-device task execution includes a memory; at least one input/output component; and a processing component operatively coupled to the memory and to the at least one input/output component, the processing component configured to execute one or more instructions stored on the memory to perform operations including: receive device information associated with a networked group of devices associated with a user; receive user preference information indicating one or more user preferences for performing one or more tasks; receive an indication of a task to be performed; determine which device of the networked group of devices to designate to perform the task, including: select a designated device of the networked group of devices associated with the user to perform the task based at least partially on the user preference information; and transmit the task to be performed to the designated device.

In at least some implementations, the processing component configured to receive an indication of a task to be performed comprises: a processing component configured to receive an indication of a task to be performed via at least one of a voice input, a typed input, or a selection from a menu of possible task options. Similarly, in at least some implementations, the processing component configured to receive an indication of a task to be performed comprises: a processing component configured to receive an indication of a task to be performed via a personal assistant. And in further implementations, the processing component configured to receive an indication of a task to be performed comprises: a processing component configured to receive an indication of a task to be performed via a personal assistant, the personal assistant being configured to perform a voice-to-text conversion, and to interpret the text to determine the task to be performed.

In addition, in at least some implementations, the processing component configured to receive device information associated with a networked group of devices associated with a user comprises: a processing component configured to receive device information associated with a networked group of devices associated with a user, the device information including personal assistant instance information associated with a plurality of devices of the networked group of devices. And in at least some other implementations, the processing component configured to transmit the task to be performed to the designated device comprises: a processing component configured to map the task to be performed to a form suitable for an instance of personal assistant installed on the designated device, and transmit the form suitable for the instance of personal assistant installed on the designated device.

In still further implementations, the processing component configured to transmit the task to be performed to the designated device further comprises: a processing component configured to transmit: a task identifier associated with the task; and a device identifier associated with a requesting device from which the indication of the task to be performed was received. In at least some implementations, the processing component is further configured to receive status information associated with a status of the task to be performed from the designated device, the status information including the task identifier associated with the task and the device identifier associated with the requesting device. In still other implementations, the processing component is further configured to receive one or more results of performance of the task, the one or more results of performance including the task identifier associated with the task and the device identifier associated with the requesting device.

In addition, in at least some implementations, the processing component is further configured to transmit at least one of status information associated with performance of the task or results of performance of the task to a requesting device from which the indication of the task to be performed was received. In at least some other implementations, the processing component configured to transmit at least one of status information associated with performance of the task or results of performance of the task to a requesting device from which the indication of the task to be performed was received comprises: a processing component configured to map the at least one of status information associated with performance of the task or results of performance of the task from a form suitable for an instance of personal assistant on the designated device to a form suitable for an instance of personal assistant installed on the requesting device.

And in some other implementations, the processing component configured to receive an indication of a task to be performed comprises a processing component configured to receive an indication of a task to be performed from a requesting device of the networked group of devices associated with the user; and wherein the processing component configured to select a designated device of the networked group of devices associated with the user to perform the task based at least partially on the user preference information comprises: a processing component configured to: determine whether the user preference information indicates that the requesting device should be the designated device; and select the requesting device as the designated device to perform the task.

In still other implementations, the processing component configured to receive an indication of a task to be performed comprises a processing component configured to receive an indication of a task to be performed from a requesting device of the networked group of devices associated with the user; and wherein the processing component configured to select a designated device of the networked group of devices associated with the user to perform the task based at least partially on the user preference information comprises: a processing component configured to: determine whether the requesting device is capable of performing the task; if the user preference information indicates a different device other than the requesting device to perform the task, select the designated device based on the user preference information; and if the user preference information does not indicate the different device other than the requesting device to perform the task, select the requesting device as the designated device to perform the task.

Further, in at least some implementations, a method for cross-device task execution, comprises: receiving device information associated with a networked group of devices associated with a user; receiving user preference information indicating one or more user preferences for performing one or more tasks; receiving an indication of a task to be performed; selecting a designated device of the networked group of devices associated with the user to perform the task based at least partially on the user preference information; and transmitting the task to be performed to the designated device.

In at least some other implementations, receiving an indication of a task to be performed comprises: receiving a spoken indication of a task to be performed via a personal assistant; performing a voice-to-text conversion of the spoken indication to a textual indication; and analyzing the textual indication to determine the task to be performed.

In other implementations, receiving device information associated with a networked group of devices associated with a user comprises: receiving personal assistant instance information associated with a plurality of devices of the networked group of devices. In still other implementations, transmitting the task to be performed to the designated device comprises: mapping the task to be performed to a form suitable for an instance of personal assistant installed on the designated device; and transmitting the form suitable for the instance of personal assistant installed on the designated device.

And in other implementations, wherein receiving an indication of a task to be performed comprises receiving an indication from a requesting device of the networked group of devices associated with the user; and wherein selecting a designated device of the networked group of devices associated with the user to perform the task based at least partially on the user preference information comprises: determine whether the user preference information indicates that the requesting device should be the designated device; and select the requesting device as the designated device to perform the task. In further implementations, wherein receiving an indication of a task to be performed comprises receiving an indication from a requesting device of the networked group of devices associated with the user; and wherein selecting a designated device of the networked group of devices associated with the user to perform the task based at least partially on the user preference information comprises: determine whether the requesting device is capable of performing the task; if the user preference information indicates a different device other than the requesting device to perform the task, select the designated device based on the user preference information; and if the user preference information does not indicate the different device other than the requesting device to perform the task, select the requesting device as the designated device to perform the task .

In addition, in at least some implementations, a system for cross-device task execution, comprises: circuitry for receiving device information associated with a networked group of devices associated with a user; circuitry for receiving user preference information indicating one or more user preferences for performing one or more tasks; circuitry for receiving an indication of a task to be performed; circuitry for determining which device of the networked group of devices to designate to perform the task, including: circuitry for selecting a designated device of the networked group of devices associated with the user to perform the task based at least partially on the user preference information; and circuitry for transmitting the task to be performed to the designated device.

CONCLUSION

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. It will be appreciated that the embodiments of techniques and technologies described above are not exhaustive of all possible embodiments considered to be within the scope of the present disclosure, and that additional embodiments may be conceived based on the subject matter disclosed herein. For example, in alternate embodiments one or more elements or components of the techniques and technologies described above may be re-arranged, re-ordered, modified, or even omitted to provide additional embodiments that are still considered to be within the scope of the present disclosure.

Alternately, or in addition, the techniques and technologies described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), Complex Programmable Logic Devices (CPLDs), etc. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Although the subject matter has been described in language specific to structural features and/or acts, it is to be understood that the subject matter defined in the appended claims is not necessarily limited to the specific features or acts described. Rather, the specific features and acts described above are disclosed as examples of implementing the claims and other equivalent features and acts are intended to be within the scope of the claims. The various embodiments and implementations described above are provided by way of illustration only and should not be construed as limiting various modifications and changes that may be made to the embodiments and implementations described above without departing from the spirit and scope of the disclosure.

What is claimed is:

1. A managing system for cross-device task execution, comprising:
    a memory; and
    a processing component operatively coupled to the memory, the processing component configured to execute one or more instructions stored on the memory to perform operations including:
        receive device information at the managing system, the device information being associated with a networked group of devices associated with a user, the networked group of devices including a first user device and a second user device communicatively coupled with the managing system, the device information indicating (1) that the first user device is configured to perform a first task that the second user device is not configured to perform, (2) that the second user device is configured to perform a second task that the first user device is not configured to perform, (3) that a first personal assistant application is operable on the first user device, and (4) that a second personal assistant application is operable on the second user device;
        access user preference information indicating one or more user preferences for performing one or more tasks on one or more of the networked group of devices, the one or more user preferences including at least a user preference for performing the second task on the second user device;
        receive an indication at the managing system from the first personal assistant application operable on the first user device of a new task to be performed;
        select a designated device to perform the new task based at least partially on the user preference information, including determine whether the new task involves the first task or the second task, and:
            (1) if the new task involves the first task, select the first user device as the designated device; or
            (2) if the new task involves the second task, map the new task to be performed into a form suitable to be received by the second personal assistant application operable on the second device, and select the second user device as the designated device; and
        transmit the new task to be performed to the designated device.

2. The managing system of claim 1, wherein the processing component configured to receive an indication at the managing system from the first personal assistant application operable on the first user device of a new task to be performed comprises:
    a processing component configured to receive an indication at the managing system from the first personal assistant application operable on the first user device of a new task to be performed via at least one of a voice input, a typed input, or a selection from a menu of possible task options.

3. The managing system of claim 1, wherein the processing component configured to receive an indication at the managing system from the first personal assistant application operable on the first user device of a new task to be performed comprises:
    a processing component configured to receive an indication from the first personal assistant application operable on the first user device of a new task to be performed, the new task being determined from a spoken input using a voice recognition component of the first personal assistant application.

4. The managing system of claim 1, wherein the processing component configured to receive an indication at the managing system from the first personal assistant application operable on the first user device of a new task to be performed comprises:
    a processing component configured to receive an indication at the managing system from the first personal assistant application operable on the first user device of a new task to be performed, the first personal assistant being configured to perform a voice-to-text conversion, and to interpret the text to determine the new task to be performed.

5. The managing system of claim 4, wherein the processing component configured to receive device information, the device information being associated with a networked group of devices associated with a user, the networked group of devices including a first user device and one or more second user devices communicatively coupled with the system, comprises:
    a processing component configured to receive device information at the managing system, the device information being associated with a networked group of devices associated with a user, the device information including personal assistant instance information associated with the first user device and the second user device, the personal assistant instance information indicating a first version of the first personal assistant application operable on the first user device, and indicating a second version of the second personal assistant application operable on the second user device.

6. The managing system of claim 5, wherein the processing component configured to transmit the new task to be performed to the designated device comprises:
    a processing component configured to transmit a form of the new task suitable to be received by the second version of the second personal assistant application operable on the second user device when the second user device is the designated device.

7. The managing system of claim 1, wherein the processing component configured to transmit the new task to be performed to the designated device further comprises:
    a processing component configured to transmit to the designated device:

a task identifier associated with the new task; and
a device identifier associated with the first user device from which the indication of the new task to be performed was received.

8. The managing system of claim 7, wherein the processing component is further configured to receive status information associated with a status of the new task to be performed from the designated device, the status information including the task identifier associated with the new task and the device identifier associated with the first user device.

9. The managing system of claim 7, wherein the processing component is further configured to receive one or more results of performance of the new task, the one or more results of performance including the task identifier associated with the new task and the device identifier associated with the first user device.

10. The managing system of claim 9, wherein the processing component configured to transmit at least one of status information associated with performance of the new task or results of performance of the new task to the first user device from which the indication of the new task to be performed was received comprises:
a processing component configured to map the at least one of status information associated with performance of the new task or results of performance of the new task from a form suitable for an instance of the second personal assistant application operable on the designated device to a form suitable for an instance of the first personal assistant application operable on the first user device, the first personal assistant application being different from the second personal assistant application.

11. The managing system of claim 1, wherein the processing component is further configured to transmit at least one of status information associated with performance of the new task or results of performance of the new task to the first user device from which the indication of the new task to be performed was received.

12. The managing system of claim 1, wherein the processing component configured to select a designated device from among the one or more second user devices of the networked group of devices associated with the user to perform the new task based at least partially on the user preference information comprises:
a processing component configured to:
confirm that the designated device indicated by the user preference information is configured to perform the new task prior to transmission of the new task to the designated device.

13. The managing system of claim 1, wherein the processing component configured to select a designated device to perform the new task based at least partially on the user preference information, including determine whether the new task involves the first task or the second task, comprises:
a processing component configured to:
determine whether the designated device is capable of performing the new task; and
if the designated device is not capable of performing the new task, analyzing the device information associated with one or more other user devices to assess which is capable of performing the new task.

14. A method for cross-device task execution, comprising:
receiving device information at a managing device, the device information being associated with a networked group of devices associated with a user, the networked group of devices including a first user device and a second user device communicatively coupled with the managing device, the device information indicating (1) that the first user device is configured to perform a first task that the second user device is not configured to perform, (2) that the second user device is configured to perform a second task that the first user device is not configured to perform, (3) that a first personal assistant application is operable on the first user device, and (4) that a second personal assistant application is operable on the second user device;
accessing user preference information at the managing device indicating one or more user preferences for performing one or more tasks on one or more of the networked group of devices, the one or more user preferences including at least a user preference for performing the second task on the second user device;
receiving at the managing device an indication from the first personal assistant application operable on the first user device of a new task to be performed;
automatically selecting by the managing device a designated device to perform the new task based at least partially on the user preference information, including determining whether the new task involves the first task or the second task, and:
(1) if the new task involves the first task, selecting the first user device as the designated device; or
(2) if the new task involves the second task, mapping the new task to be performed into a form suitable to be received by the second personal assistant application operable on the second device, and select the second user device as the designated device; and
transmitting the new task to be performed to the designated device.

15. The method of claim 14, wherein receiving at the managing device an indication from the first personal assistant application operable on the first user device of a new task to be performed comprises:
receiving at the managing device a spoken indication from the first user device of the new task;
performing a voice-to-text conversion of the spoken indication to a textual indication; and
analyzing the textual indication to determine the task to be performed.

16. The method of claim 14, wherein receiving device information at a managing device, the device information being associated with a networked group of devices associated with a user comprises:
receiving information indicating that the first personal assistant application is different from the second personal assistant application.

17. The method of claim 16, wherein transmitting the new task to be performed to the designated device comprises:
mapping the new task to be performed to a form suitable for the second personal assistant application installed on the second user device when the second user device is the designated device; and
transmitting the form suitable for the second personal assistant application installed on the designated device.

18. The method of claim 14, wherein automatically selecting by the managing device a designated device to perform the new task based at least partially on the user preference information, including determining whether the new task involves the first task or the second task comprises:
if the new task involves the second task, confirming that the designated device indicated by the user preference information is configured to perform the new task.

19. The method of claim 14, wherein automatically selecting by the managing device a designated device to perform the new task based at least partially on the user preference information, including determining whether the new task involves the first task or the second task comprises:

determining whether the designated device is capable of performing the new task; and if the designated device is not capable of performing the new task, analyzing the device information associated with one or more other user devices to assess which is capable of performing the new task.

20. A system for cross-device task execution managed by a managing device, comprising:

circuitry for receiving device information at the managing device, the device information being associated with a networked group of devices associated with a user, the networked group of devices including a first user device and a second user device communicatively coupled with the managing device, the device information indicating (1) that the first user device is configured to perform a first task that the second user device is not configured to perform, (2) that the second user device is configured to perform a second task that the first user device is not configured to perform, (3) that a first personal assistant application is operable on the first user device, and (4) that a second personal assistant application is operable on the second user device;

circuitry for accessing user preference information at the managing device indicating one or more user preferences for performing one or more tasks on one or more of the networked group of devices, the one or more user preferences including at least a user preference for performing the second task on the second user device;

circuitry for receiving at the managing device an indication from the first personal assistant application operable on the first user device of a new task to be performed;

circuitry for automatically selecting by the managing device a designated device to perform the new task based at least partially on the user preference information, including determining whether the new task involves the first task or the second task, and:

(1) if the new task involves the first task, selecting the first user device as the designated device; or (2) if the new task involves the second task, mapping the new task to be performed into a form suitable to be received by the second personal assistant application operable on the second device, and selecting the second user device as the designated device; and circuitry for transmitting the new task to be performed to the designated device.

\* \* \* \* \*